United States Patent Office 3,284,511
Patented Nov. 8, 1966

3,284,511
HALOGENATED, DIOLEFIN-STYRENE POLYMERS WITH TERMINAL HYDROXY GROUPS
Stanley P. Rowland, Ervin G. Pritchett, and Noel L. Hofmann, all of Cincinnati, Ohio, assignors to National Distillers and Chemical Corporation, New York, N.Y., a corporation of Virginia
No Drawing. Filed Dec. 13, 1961, Ser. No. 159,139
1 Claim. (Cl. 260—618)

The present invention relates to novel chemical compounds and to a process for their manufacture. More particularly, the present invention relates to polymerized derivatives of dialkali metal hydrocarbon compounds in which each of the two alkali metal atoms is linked to a different carbon atom in an aliphatic hydrocarbon group or in an aliphatic hydrocarbon chain that may contain aromatic, e.g., phenyl, substituents. Still more particular, the invention relates to high molecular weight dialkali metal polymerized hydrocarbons and to the production therefrom of high molecular weight halogenated glycols.

Novel compounds embodied by the present invention are halogenated derivatives of substantially difunctional polymers, described in detail in copending application S.N. 75,907 (filed December 15, 1960), that are valuable as raw materials for plastics, rubbers, foams, coatings, and the like. More specifically, they are derivatives of dialkali metal polymeric hydrocarbons in which the polymeric hydrocarbon group has a molecular weight of at least about 300, each alkali metal atom is linked to a different carbon atom in an aliphatic chain or in aromatic-substituted aliphatic hydrocarbon chain, and the polymeric hydrocarbon group contains more than two units of a monomer from the group consisting of aliphatic conjugated diolefins, styrene, and alkyl-substituted styrenes. These novel halogenated products are made by halogenating the polymeric glycols which are prepared from polymers formed by addition of molecular units of a monomer to a relatively low molecular weight dialkali metal hydrocarbon until a higher molecular weight dialkali metal hydrocarbon, having a molecular weight in excess of about 300, has been built up. In a specific illustration, a sufficient amount of butadiene is reacted with a mixture of isomeric disodiooctadienes (containing straight chain and branched chain isomers) to yield a disodiopolybutadiene of the desired molecular weight. The disodiopolybutadiene may then be reacted with, for example, an epoxide compound, followed by hydrolysis, to yield the corresponding glycol. The glycol is then halogenated, for example by treating with chlorine.

The process embodied herein is particularly well adapted to the use of dilithiooctadiene, mixtures of isomeric disodiooctadienes, and disodiodiphenylbutane as the low molecular weight dialkali metal hydrocarbon and to butadiene or styrene as the monomer to be added thereto. The process of this invention, however, is in general applicable to addition products of saturated or unsaturated dialkali metal hydrocarbons with aliphatic diolefins, styrene, or substituted styrenes. For example, the starting material utilized for practice of this invention may be a dialkali metal dimer of an aliphatic conjugated diolefinic hydrocarbon such as butadiene, isoprene, 1,3-pentadiene, and the like or of an aromatic compound containing an olefinic substituent such as styrene or alkyl-substituted styrene, such as α-methylstyrene, vinyltoluene, and so forth. The low molecular weight dialkali metal hydrocarbon starting materials of this invention may, for example, be an isomeric mixture of disodiooctadienes prepared by treating butadiene with finely dispersed sodium, preferably a dispersion thereof in which the particle size of the sodium does not exceed about three microns, in a selected liquid medium, such as dimethyl ether, and, if desired, in the presence of a relatively small amount of a polycyclic aromatic hydrocarbon, such as anthracene, benzophenone, naphthalene, or terphenyl, and/or in the presence of a selected solid, friable attrition agent at a temperature preferably below about 0° C., or it may be disodiodiphenylbutane prepared similarly from styrene. Processes for preparing such alkali metal hydrocarbons are disclosed in, for example, U.S. Patent Nos. 2,816,913, 2,816,914, 2,816,916, 2,816,917, and 2,816,936.

In accordance with the preferred embodiment of this invention, the lower molecular weight dialkali metal hydrocarbon is reacted with a monomer such as, for example, butadiene, styrene, or the like. In another embodiment of this invention, a finely-dispersed alkali metal, such as sodium or, preferably, lithium, is reacted with a monomer, such as butadiene or styrene, to form a dialkali metal hydrocarbon, for example, by a process such as is disclosed in U.S. Patent No. 2,816,913. The addition of monomer is continued until a dialkali metal polymeric hydrocarbon of the desired molecular weight has been built up. The monomer with which the lower molecular weight dialkali metal hydrocarbon is reacted may be the same as the monomer used in making the lower molecular weight dialkali metal hydrocarbon or different from it.

The polymerization reaction suitably is conducted in the presence of a liquid reaction medium which essentially contains certain types of ethers. The ether medium can be any aliphatic monoether having a methoxy group in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol with alkyl groups. Examples are the ethylene glycol dialkyl ethers such as the dimethyl, methyl ethyl, diethyl methyl butyl, ethyl butyl, dibutyl, and butyl lauryl ethylene glycol ethers; trimethylene glycol dimethyl ether, glyceryl trimethyl ether, glycerol dimethyl ethyl ether, and the like. Generally, simple methyl monoethers such as dimethyl ether and the polyethers of ethylene glycols such as ethylene glycol dimethyl ether are preferred.

Although it is preferred that the reaction medium for the polymerization reaction consist substantially of the ethers as specified, other inert liquid media can be present in limited amounts, replacing for example from about 5 to about 50 percent of the ether. Examples of these inert media include hexane, benzene, alkylate, triethylamine, and mixtures thereof.

The polymerization reaction is generally carried out at a temperature between the reflux temperature of the liquid reaction medium and about −60° C. or lower, and is preferably between about reflux temperature and −40° C.

The amount of monomer added to the lower molecular weight dialkali metal hydrocarbon depends upon the molecular weights of the reactants and upon the desired molecular weight of the polymerized product. In general, the desired molecular weight of the dialkali metal polymeric hydrocarbon product lies between about 300 and several hundred thousand, preferably 500 to 5,000 for many applications. Thus, regarding the relative amounts of reactants to employ, and in the case of reacting the alkali metal with the monomer, use is made of an excess of the monomer over mole to mole ratio with the alkali metal. That is, the total amount of monomer that is employed until completion of the reaction is in excess of one mole of the monomer per mole of alkali metal, the excess of monomer employed being, as aforesaid, dependent on its molecular weight and the desired molecular weight of the desired polymerized product.

The polymers of this invention contain sufficient units of the selected monomer to give a product having the desired molecular weight, that is, the molecular weight which will make the polymer most suitable for the desired ultimate use. To illustrate, a polymer intended to be used for rigid or semi-rigid foams will preferably have a molecular weight in the range of about 300 to 800. Polymers intended for use as flexible foams will suitably have molecular weights in the range of about 1,000 to 4,000. The molecular weight range for difunctional polymers to be used in coatings or in elastomers for casting resins is suitably about 1,000 up to about 10,000 or up to about several hundred thousand for millable rubbers.

In preferred practice of this invention, the lower molecular weight dialkali metal dimerized hydrocarbon is formed prior to the addition of the monomer for polymerization. It is possible, however, in another embodiment of this process to form the lower molecular weight dialkali metal dimerized hydrocarbon during the addition of the monomer; that is, to start with a monomer and an alkali metal and to continue feeding the monomer into the system until the desired dialkali metal polymeric hydrocarbon is formed, without stopping the reaction at the dialkali metal hydrocarbon dimer stage. The present process may be carried out either in a continuous, semi-continuous, or batchwise manner, and it is not intended to limit the process to any particular method of operation.

The higher molecular weight dialkali metal polymeric hydrocarbons of this invention can be converted into glycols by reacting a suitable compound with such a higher molecular weight dialkali metal polymeric hydrocarbon. Such a suitable glycol-forming reactant may be an epoxide, for example, an aliphatic epoxide such as ethylene oxide, propylene oxide, or the butylene oxides or it may be an aromatic epoxide such as styrene oxide. The glycol-forming reactant may also be a suitable carbonyl-type compound, such as, for example, aldehydes; examples thereof include formaldehyde, paraformaldehyde, acetaldehyde, propionaldehyde, butyraldehyde, isobutryaldehyde, and the octylaldehydes such as 2-ethylhexaldehyde. Aromatic and heterocyclic aldehydes such as benzaldehyde and furfural may also be used, as may such aldehydes as salicyaldehyde, anisaldehyde, cinnamaldehyde, piperonal, vanillin, acrolein, and crotonaldehyde. Carbonyl compounds of the ketone class also may be employed, for example, acetone, methyl ethyl ketone, diethyl ketone, acetophenone, benzophenone, methyl vinyl ketone, metisyl oxide, phorone, and benzoquinone. It is also possible to produce glycols from the higher molecular weight dialkali metal polymeric hydrocarbons of this invention by oxidizing them with oxygen itself, either as pure oxygen or admixed with inert materials such as in dry air. Ozone also may be employed as well as oxidizing materials which yield oxygen or its oxidizing equivalents. These include sodium peroxide, hydrogen peroxide, the persulfates, and other organic and inorganic peroxides, metal peroxides, nitrogen oxides, nitro-aromatic compounds such as nitrobenzene, and some metal salts.

At least two equivalents of the glycol-forming reactant are required for each molecule of the dialkali metal polymeric hydrocarbon. In order to insure complete reaction for glycol formation, an excess of the glycol-forming reactant is usually employed; for example, when using an epoxide the excess may be up to about 400 percent, and is preferably from about 10 percent to about 50 percent.

The reaction with the glycol-forming compound, for example as in the case of using an epoxide, is followed by treating the dialkali metal salts of the resulting corresponding glycols with a hydrolyzing agent, e.g., water, an alcohol such as methanol or ethanol, etc., to destroy any unreacted alkali metal and to liberate the glycols from their dialkali metal derivatives which are initially formed. The glycols are isolated from this reaction mixture by extraction, distillation, or other suitable means. The resulting glycols have molecular weights ranging from about 300 up to several hundred thousand, depending upon the operating conditions.

The glycol-forming reaction may, if desired, take place in the presence of a liquid reaction medium, such as an ether. When an ether is used, it is preferably selected from the aforelisted group of ethers suitable as reaction media for the addition of polymerization step. The specific ether used in the condensation step is, however, not necessarily the same ether as that employed in the formation of the higher molecular weight dialkali metal polymeric hydrocarbon, although for convenience the same ether generally is selected. Other useful reaction media include hexane, alkylate, benzene, triethylamine, and the like, and mixtures thereof.

The reaction of the higher molecular weight dialkali metal polymeric hydrocarbon with the appropriate glycol-forming compound is generally carried out at a temperature between about the reflux temperature of the selected reaction medium and about $-60°$ C., or lower, and is preferably between about the reflux temperature and about $-40°$ C. When no ether is used, however, the upper limit of operable temperatures can be higher, for example, as high as about $100°$ C.

During the entire operation, that is, polymerization as well as glycol formation, it is important that the presence of moisture and compounds containing active hydrogen be carefully controlled in order to keep to a minimum the formation of monohydroxy compounds. It is also necessary that other materials which would be reactive to the dialkali metal adduct be excluded. The reaction, therefore, should be conducted in an inert atmosphere to exclude moisture, oxygen, carbon dioxide, compounds containing active hydrogen, such as alcohols, esters, amines containing H on N, and the like, and other impurities. The reaction preferably is carried out in an atmosphere of nitrogen or other inert gas, such as helium or argon.

Although the process of this invention is applicable equally to any glycol-forming reactant, for convenience it will be described with relation to reaction with an epoxide; it is not, however, intended to be limited thereto.

The unsaturated glycol thus-formed is then halogenated. Although the process of this invention is applicable equally to any suitable chloride, bromide, or iodide reactant, for convenience it will be described with relation to reaction with a chloride. It is not intended, however, to be limited thereto.

Halogenation products of the polymeric glycols may be produced by any convenient means, for example by the simple addition of chlorine to the double bonds of the glycol at a temperature between about $-20°$ and $30°$ C. or by use of other halogenating agents such as sulfuryl chloride.

Although the use of a solvent is not essential, such solvents as carbon tetrachloride, acetic acid, or carbon disulfide may be used. Preferred solvents are those that are unreactive to the halogenating agent and are readily removed from the halogenated glycol, such as for example low-boiling polychlorinated hydrocarbons.

The following general equations are presented to illustrate the mechanism of the process of this invention, using butadiene, styrene, and ethylene oxide to represent the reactants:

(1) $2Na + a(C_4H_6) + b(PhCHCH_2) \rightarrow$
$\quad Na-[(C_4H_6)_a(PhCHCH_2)_b]-Na$
(I)

(2) $(I) + 2C_2H_4O/H^+ \rightarrow HO-C_2H_4$
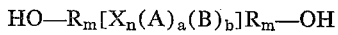
$[(C_4H_6)_a(PhCHCH_2)_b]C_2H_4-OH$
(II)

(3) $(II) + n/2\ X_2$ (cat.) $\rightarrow HO-C_2H_4$
$[X_n(C_4H_6)_a(PhCHCH_2)_b]C_2H_4-OH$
(III)

where (I) is a dialkali metal polymerized hydrocarbon; (II) is a high molecular weight glycol; (III) is the halogenated high molecular weight glycol product of this invention; $a$ is a whole number of at least 2, and preferably from 2 to about 200; $b$ is 0 or above; the ratio of $b$ to $a$ ranges from 0 to about 9 inclusive; X is a halogen atom; and $n$ is a whole number ranging from about 2 to $2a$, and preferably about 10 to about 200. The halogenation, as shown in Equation 3, occurs essentially with the diolefinic segment of the main polymer chain.

Accordingly, the halogenated high molecular weight terminal glycols of this invention have the general formula $$HO-R_m[X_n(A)_a(B)_b]R_m-OH$$

wherein R is a divalent hydrocarbon radical, A is a diolefin radical, B is a radical selected from the group consisting of styrene and alkyl-substituted styrenes, X is a halogen, $a$ is a whole number of at least 2, $b$ is 0 to about $9a$, $m$ is 0 to 1, and $n$ is a whole number ranging from about 2 to $2a$. The molecular weight of these compounds is at least 300, and generally is in the range of about 300 to about 25,000.

Halogenation of the polymeric glycol introduces fire-resistant properties to the resulting product. In addition, items fabricated from the halogenated polymeric glycol, e.g., foams, coatings, and castings, have improved stiffness and chemical resistance. Chlorinated polybutadiene glycols are useful as coating materials when employed as the sole resinous composition or when employed with other film-forming components, such as for example polyesters; alkyd resins; polyvinyl chloride; vinyl chloride-vinyl acetate copolymers; cellulose derivatives such as cellulose acetate, ethyl cellulose, etc.; phenolic resins; and acrylic polymers. For example, chlorinated polybutadiene glycols may be combined with an alkyd resin in a simple blend or may be formulated into the alkyd resin to supplement the polyhydric alcohols or to replace partially some of the polyhydric alcohols, resulting in a coating composition having improved solvent resistance, fire resistance, and hardness.

Chlorinated products of a resinous glycol containing styrene-type units, e.g., α-methylstyrene, vinyltoluene, and the like, in addition to butadiene units exhibit improved compatability with the other film-forming component and, in some cases, improved hardness over compositions based on the polybutadiene glycol.

The halogenated polymeric glycols of this invention also are useful for producing castings, for example by dissolving the glycol in diisocyanate with stirring and warming. Prior to the introduction of the isocyanate, it may, for convenience, be desirable to dissolve the glycol in a supplementary polyhydric compound, such as castor oil, poly(ethylene adipate) having a molecular weight of about 2,000, or propylene glycol having a molecular weight of about 2,000.

Similarly, plastic sheets may be prepared from a halogenated resinous diol, with or without supplementary diols, by reacting it with a di- or a polyisocyanate; in such cases it is generally desirable to provide adequate opportunity for the polymerization reaction to reach completion at moderate temperatures, that is temperatures of about 70° to 100° C.

The more detailed practice of the invention is illustrated by the following examples wherein parts are given by weight unless otherwise specified. These examples and embodiments are illustrative only, and the invention is not intended to be limited thereto except as indicated by the appended claims.

*Example 1*

To 1.71 parts of disodiooctadiene in a mixture of 50 parts of dimethyl ether and 2.6 parts of alkylate was introduced 6.3 parts of 1,3-butadiene at the rate of 15 pounds per hour while maintaining the temperature at about −30° C. and agitating vigorously. Upon completion of the addition of the butadiene, the reaction mixture was stirred for an additional 30 minutes at about −36° C. Two parts of ethylene oxide was then added, and stirring was continued for 45 minutes at −30° C. The mixture was then ejected onto Dry Ice. The ether solvent was removed by evaporation, the residue was purged with steam, and the resulting aqueous emulsion was acidified with oxalic acid. The viscous product was separated from the aqueous layer, washed with water, dried under vacuum at 100° to 125° C. with concurrent removal of alkylate, and filtered. The finished product had a hydroxyl number of 143.5 and an acid number of 0.6, indicating a diol having a molecular weight of 779. Reaction with a 5 percent excess of tolylene diisocyanate and an amine catalyst resulted in a rubbery solid, indicating the approximate functionality of the product to be 2.0.

*Example 2*

To 0.76 part of dilithiooctadiene in a mixture of 44 parts of dimethyl ether and 1 part of alkylate was added 11 parts of 1,3-butadiene at the rate of 94 pounds per hour. When the addition of the butadiene was complete, stirring was continued for 90 minutes at −30° to −32° C. Then 2.5 parts of ethylene oxide was added, maintaining the temperature at −30° C. The product, worked up as in Example 1, had a viscosity of 768 poises at 25° C., a hydroxyl number of 62.8, and an acid number of 0.4, corresponding to a diol having a molecular weight of 1,780.

*Example 3*

To 1 part of cesium in 44 parts of dimethyl ether was added to 9.8 parts of 1,3-butadiene at the rate of 12 parts per hour. When the addition of the butadiene was complete, the mixture was stirred at −39° C. for 25 minutes. Then 1.5 parts of ethylene oxide was added over a period of 5 minutes at −39° C. After being stirred for an additional 10 minutes, the reactor contents were removed and worked up as in Example 1. The viscous liquid product has an intrinsic viscosity of 0.26 in xylene at 25° C., a hydroxyl number of 12.5, and an acid number of 0.2, equivalent to a diol molecular weight of 8,850.

*Example 4*

In a manner similar to that described in Example 3, fifty-three parts of butadiene was reacted with 1 part of cesium dispersed in dimethyl ether, and the polymer was terminated by reaction with 1.5 parts of ethylene oxide. The product was isolated as a tacky, soft, milky-white gum having a hydroxyl number of 2.0 and an apparent molecular weight of 56,000. The gum could be cured via dicumyl peroxide or via tolylene diisocyanate to rubber stocks exhibiting attractive degrees of elasticity and flexibility.

*Example 5*

To 7.1 parts of disodiopolybutadiene (from 0.6 part of sodium and 6.5 parts of 1,3-butadiene) in 50 parts of dimethyl ether and 5 parts of alkylate was added 2.5 parts of styrene. The mixture was stirred for 30 minutes at −30° C. Two parts of ethylene oxide was then added. After having been stirred for 34 minutes, the product was removed and worked up as in Example 1. The acidified and dried product had a hydroxyl number of 130 and an acid number of 0.5, corresponding to a diol having a molecular weight of 861.

Example 6

To 2.82 parts of disodiodiphenylbutane in 50 parts of dimethyl ether and 5 parts of alkylate was added 6.5 parts of 1,3-butadiene over a 68 minute period at an average temperature of −36° C. Ethylene oxide (2.0 parts) was then added. After being stirred for 25 minutes, the product was removed and worked up by the procedure described in Example 1. The product had a hydroxyl number of 142.0 and an acid number of 0.8, corresponding to a diol having a molecular weight of 788.

Example 7

To 83.4 parts of disodiodiphenylbutane (formed by a reaction of 81.5 parts of styrene with 19 parts of sodium) in a mixture of 975 parts of dimethyl ether and 1000 parts of hexane was added 82.9 parts of styrene dissolved in an equal volume of a alkylate. The addition was carried out at −38° C. with vigorous agitation. Ten minutes after the completion of addition of styrene, 40 parts of ethylene oxide was added at −40° C., and agitation was continued for a period of 15 minutes. The product was worked up as described in Example 1. There was obtained 183 parts of an extremely viscous and nearly solid material having a hydroxyl number of 230, corresponding to a polystyrene glycol of molecular weight 488.

Example 8

To a reaction vessel equipped with a Dry-Ice cooled condenser terminated with a nitrogen purge, a low-temperature thermometer, a gas-inlet tube, and an agitator were charged the following in the order listed: 3.0 parts of p-terphenyl, 1,950 parts of dimethyl ether, and 10 parts of a fine dispersion of sodium in purified kerosene (2.3 parts of sodium having a maximum particle size of about three microns).

Within 15 minutes at −30° C. a blue color developed in the reaction mixture, indicating the formation of a sodioterphenyl complex. Then 5.4 parts of 1,3-butadiene was added to yield disodiooctadiene (0.05 mole). After 30 minutes 108 parts of 1,3-butadiene was introduced into the reaction mixture at the rate of 1.8 parts per minute while maintaining the temperature at about −30° C. and agitating vigorously. Upon completion of the addition of the butadiene, the reaction mixture was stirred for an additional 15 minutes at about −30° C. A 98 percent yield of disodiopolybutadiene was obtained. The product, unstable to air, was reacted with water for purposes of identification. The resulting hydrocarbon oil was highly unsaturated (Hanus iodine number 405 and hydrogenation number 450 [1]) and had an intrinsic viscosity of 0.07 in xylene at 23° C.

When the butadiene addition was complete, 6.2 parts (0.14 mole) of ethylene oxide was added to 113 parts of the disodiopolybutadiene, at the rate of 0.41 grams per minute, the reactor temperature being maintained at about −30° C. The reaction mixture was agitated vigorously for an additional 10 minutes at about −30° C. and then poured onto Dry Ice. The ether solvent was removed from the reaction mixture by evaporation, and the residue was purged with steam and acidified. The viscous, polymeric product which separated on top of the water layer was dissolved in 440 parts (500 ml.) of benzene, and the organic solution was filtered and washed repeatedly with distilled water until the aqueous phase was neutral. The benzene and other volatile materials were removed from the organic solution by distillation at about 70° C. and a pressure of 5 mm. of mercury. An 82% yield was obtained of a light-colored, slow-flowing, sticky resin having a viscosity of approximately 1,000 poises at room temperature and approximately 0.6 poise at a 50% concentration in ethylene acetate monoethyl ether. The polymeric glycol product had a hydroxyl number of 35, corresponding to an equivalent weight of 1,600 and a molecular weight of 3,200. Reaction with a 5 percent excess of tolylene diisocyanate and an amine catalyst resulted in a rubbery solid, indicating approximate difunctionality of the product.

Example 9

To a reaction vessel equipped with a Dry-Ice cooled condenser terminated with a nitrogen purge, a low-temperature thermometer, a gas-inlet tube, and an agitator were charged the following in the order listed: 4.0 parts of naphthalene, 1,950 parts of dimethyl ether, and 2.5 parts of a fine dispersion of lithium (0.75 part of metal) in mineral oil. At −35° C., 80 parts of butadiene was added at the rate of 1.5 parts per minute. When the addition was complete, stirring was continued for 60 minutes. Then 6.6 parts of ethylene oxide was added at a temperature between about −35° and −25° C., and stirring was continued for 30 minutes. The mixture was then ejected onto Dry Ice. The ether solvent was evaporated, the residue was purged with steam, and the resulting aqueous emulsion was acidified with oxalic acid. The viscous product was then separated from the aqueous layer, washed with water, dried under vacuum at 100° to 125° C., and filtered. The product had a hydroxyl number of 72.4 and an acid number of 0.1, corresponding to a diol having a molecular weight of 1,550. The viscosity of the product was 430 poises at 25° C.

Example 10

To a reaction vessel such as is described in Example 8 were added 3.0 parts of naphthalene, 1,950 parts of dimethyl ether, and 23.3 parts of a fine dispersion of sodium (5.75 parts of metal) in purified kerosene. At −35° C., 115.5 parts of isoprene diluted with an equal volume of purified hexane was added over a period of 69 minutes. The mixture was stirred at −32° C. for 15 minutes after completion of the isoprene addition. Then 22 parts of ethylene oxide was added over a 17-minute period at an average temperature of −32° C. Stirring was continued for 10 minutes, after which the reactor contents were removed and worked up as in Example 8. The acidified, dried product had a hydroxyl number of 82.7 and acid number of 0.8, corresponding to a diol having a molecular weight of 1,350.

Example 11

To a reaction vessel equipped with a Dry-Ice cooled and nitrogen-purged condenser, a low-temperature thermometer, a gas-inlet tube, and an agitator were charged the following materials in the order listed: 3.0 parts of naphthalene, 1,950 parts of dimethyl ether, 16.2 parts of a fine dispersion of sodium (4.6 parts of metal) in the purified kerosene, and 20.8 parts of styrene in an equal volume of purified kerosene. The mixture was stirred for 15 minutes at −33° C. Butadiene (120 parts) was then added over a period of 43 minutes at an average temperature of −32° C. Then 17.6 parts of ethylene oxide was added. After being stirred for 10 minutes, the product was removed and worked up by the procedure described in Example 8. The acidified, dried product had a hydroxyl number of 63.6 and an acid number of 0.3, corresponding to a diol having a molecular weight of 1,760.

Example 12

Example 8 was repeated, except that 24 parts of styrene oxide was used in place of ethylene oxide. The acidified, dried product had a hydroxyl number of 44.5 and an acid number of 0.5, corresponding to a diol having a molecular weight of 2,500.

---

[1] Grams of iodine equivalent to the moles of hydrogen absorbed by 100 grams of sample.

Example 13

Fifty-two and four tenths parts of a resinous diol, prepared as embodied herein, was dissolved in 462.6 parts of carbon tetrachloride; chlorine gas was bubbled through the stirred solution at −15° to −20° C. for 2.8 hours. At the end of this time, 53.7 grams of chlorine had been absorbed by the resinous diol. Evaporation of the solvent yielded a light tan, solid product which was taken up in toluene and washed with dilute sodium hydroxide and water. Removal of the toluene yielded 34.5 parts of a light brown powder. A sample of the solid product produced above was dissolved in acetone and cast as a 3-mil film on clean glass plate. The solvent was allowed to evaporate, and the film was cured at 80° C.; a hard, resistant coating was obtained on the glass. The film did not ignite readily when brought in contact with a flame, indicating fire-resistant properties.

Example 14

A resinous diol having a molecular weight of 1,200 and prepared as embodied herein, was chlorinated by the procedure of Example 13 to a product having a molecular weight of 2,000. The chlorinated product was dissolved in an equal weight of a resinous diol having a molecular weight of 2,000. To 30 parts of the resulting mixture were added 0.86 part of water, 0.50 part of a silicone resin (Union Carbide Corporation's L–520), 0.12 part of triethylene diamine, 0.39 part of N-ethylmorpholine, and 0.05 part of stannous octoate. The resulting composition was agitated with a high-speed mixer for 5 to 10 seconds, 1.28 parts of tolylene diisocyanate was introduced quickly, and the mixture was agitated for an additional 5 to 10 seconds. The resulting foaming mixture was poured into a mold and allowed to rise to full height. Cure was completed by placing the foam in an oven at 100° C. for one to two hours. The product foam was semi-rigid and exhibited fire-resistant properties that were superior to those of normal polyurethan foams. The semi-rigid, fire-resistant foam was suitable for use in specialized packaging for shipments where fire code requirements call for these properties.

While there are above disclosed but a limited number of embodiments of the invention herein presented, it is possible to produce still other embodiments without departing from the inventive concept herein disclosed. It is desired, therefore, that only such limitations be imposed on the appended claim as are stated therein.

What is claimed is:

A halogenated terminal glycol having a molecular weight in the range of about 300 to about 25,000 and having the general formula $$HO-[CH_2-CH_2]_m[Cl_n(A)_a(B)_b][CH_2CH_2]_m-OH$$

wherein A is a polymerized diolefin unit selected from the group consisting of butadiene and isoprene, B is a unit of polymerized monomer selected from the group consisting of styrene and alkyl-substituted styrenes, $a$ is a whole number ranging from 2 to about 200, $b$ is 0 to about 1800, the ratio of $b$ to $a$ ranges from 0 to about 9 inclusive, $m$ ranges from 0 to 1 inclusive, and $n$ is a whole number ranging from about 2 to 2$a$; said halogenated terminal glycol being that which is obtained by halogenating a compound having the general formula $$HO-[CH_2-CH_2]_m[(A)_a(B)_b][CH_2-CH_2]_m-OH$$

wherein A, B, $a$, $b$ and $m$ are as defined above, with a halogenating agent selected from the group consisting of elemental chlorine and sulfuryl chloride at a temperature between about −60° and +100° C.

References Cited by the Examiner

UNITED STATES PATENTS

| | | | |
|---|---|---|---|
| 2,773,092 | 12/1956 | Carly et al. | 260—635 X |
| 2,850,538 | 9/1958 | Nobis et al. | 260—635 |
| 2,985,594 | 5/1961 | Zimmermann | 260—618 |
| 3,055,952 | 9/1962 | Goldberg | 260—618 |
| 3,175,997 | 3/1965 | Hsieh | 260—635 |

OTHER REFERENCES

Wagner et al.: "Synthetic Organic Chemistry," N.Y., J. Wiley & Sons, Inc., 1953, pp. 106–107.

LEON ZITVER, *Primary Examiner.*

CHARLES B. PARKER, *Examiner.*

A. H. SUTTO, M. B. ROBERTO, J. M. BANE, T. G. DILLAHUNTY, *Assistant Examiners.*